UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

QUINOLIN COMPOUNDS AND PROCESS OF PRODUCING SAME.

1,138,937.  Specification of Letters Patent.  Patented May 11, 1915.

No Drawing.  Application filed May 20, 1914. Serial No. 839,842.

*To all whom it may concern:*

Be it known that I, ALEX B. DAVIS, a citizen of the United States, residing at Indianapolis, Marion county, and State of Indiana, have invented and discovered certain new and useful Improvements in Quinolin Compounds and Process of Producing Same, of which the following is a specification.

The invention relates to new compounds of the quinolin series prepared by boiling together in solution equimolecular proportions of pyruvic acid, an aldehyde, and an ester of para-amino-benzoic acid. The new compounds are all derivatives of 2-phenyl-quinolin 4:6 dicarboxylic acid. These derivatives are valuable pharmaceutical compounds.

Compounds prepared in this way are: 2-meta-para-dioxymethylene-phenyl-quinolin 4:6 dicarboxylic acid-6-ethyl-ester, (from heliotropin, para-amino-ethyl-benzoate, and pyruvic acid). 2-phenyl-quinolin 4:6 dicarboxylic acid-6-ethyl-ester, (from benzaldehyde, para-amino-ethyl-benzoate, and pyruvic acid). 2-ortho-oxyphenyl-quinolin-4:6-dicarboxylic-acid 6-ethyl-ester, (from salicylic aldehyde, para-amino-ethyl-benzoate and pyruvic acid). 2-para-methoxy-phenyl-quinolin-4:6-dicarboxylic acid 6-ethyl-ester, (from para-anisic-aldehyde, para-amino-ethyl-benzoate, and pyruvic acid). 2-para-oxy-meta-methoxy-phenyl-quinolin-4:6-dicarboxylic acid 6-ethyl ester, (from vanillin, para-amino-ethyl-benzoate, and pyruvic acid). All of these are yellow to white crystalline powders slightly soluble in alcohol, insoluble in water and melting at high temperatures. They are soluble with decomposition in strong sulfuric acid and in hot concentrated alkalies.

In general the process is as follows:—One molecular proportion of an ester of para-amino-benzoic-acid is dissolved in absolute alcohol on heating. The solution is placed in a flask and connected to a reflux condenser and heated to boiling. There is now added one molecular proportion of aromatic aldehyde diluted with its own volume of absolute alcohol and the resulting mixture boiled ten minutes. One molecular proportion of pyruvic acid is now allowed to run in slowly through the condenser and in a short time the condensation product, the new quinolin derivative, begins to crystallize out or will do so if the mixture be boiled for an hour and then let stand. The compounds may be purified by recrystallizing from absolute alcohol.

The ester produced may be expressed by the following general formula:—

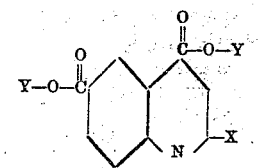

in which X is any aryl group and Y any monovalent radical.

In carrying out the process in detail, taking a particular product, one may proceed as follows:—188 parts by weight of para-amino-ethyl-benzoate are dissolved in 200 parts of hot absolute alcohol and this solution placed in a flask connected to a reflux condenser, 106 parts of benzaldehyde diluted with 106 parts of absolute alcohol are added and the resulting mixture boiled ten minutes. 88 parts of pyruvic acid are now run in through the condenser. After boiling a short time the whole mass suddenly solidifies. 500 parts of 90% alcohol are now added and the mass broken by shaking until it is a thick paste. This is poured on to a filter and the liquor removed by suction. The residue on the filter is broken up and purified by washing and recrystallizing from alcohol, the finished product being a white crystalline powder. It is 2-phenyl-quinolin-4:6-dicarboxylic acid 6-ethyl-ester and has the formula

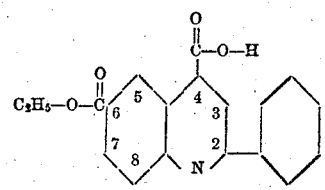

What I claim is:

1. An ester of the quinolin group having the following formula:—

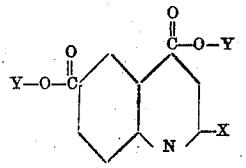

in which X is any aryl group and Y any monovalent radical.

2. An ester of 2-phenyl-quinolin-4:6-dicarboxylic acid.

3. 2-phenyl-quinolin-4:6-dicarboxylic 6 ethyl ester.

4. The process of producing derivatives of quinolin which consists in condensing an ester of para-amino-benzoic acid and an aromatic aldehyde with pyruvic acid.

5. The process of producing derivatives of quinolin consisting in boiling together in absolute alcoholic solution, equimolecular proportions of an ester of para-amino-benzoic acid, an aromatic aldehyde and pyruvic acid.

6. The process of producing a derivative of quinolin by boiling together in absolute alcoholic solution equimolecular proportions of benzaldehyde, para-amino-ethyl-benzoate and pyruvic acid.

7. The process of producing a derivative of quinolin which consists in dissolving substantially 188 parts by weight of para-amino-ethyl benzoate in substantially 200 parts of hot absolute alcohol, adding to this solution substantially 106 parts of benzaldehyde diluted with substantially 106 parts of absolute alcohol, boiling the mixture for condensation, introducing substantially 88 parts of pyruvic acid and continuing the boiling until the mass solidifies, then adding substantially 500 parts of substantially 90% alcohol and reducing the mass to a thick paste, removing the liquor and purifying the residue.

In witness whereof, I have hereunto set my hand and seal at Indianapolis, Indiana, this sixth day of May, A. D. nineteen hundred and fourteen.

ALEX B. DAVIS. [L. s.]

Witnesses:
E. G. EBERHARDT,
ARTHUR L. WALTERS.